United States Patent
Chow

(10) Patent No.: US 8,010,994 B2
(45) Date of Patent: Aug. 30, 2011

(54) APPARATUS, AND ASSOCIATED METHOD, FOR PROVIDING COMMUNICATION ACCESS TO A COMMUNICATION DEVICE AT A NETWORK ACCESS PORT

(75) Inventor: Anthony T. Chow, San Gabriel, CA (US)

(73) Assignee: Alcatel Lucent, Paris (FR)

( * ) Notice: Subject to any disclaimer, the term of this patent is extended or adjusted under 35 U.S.C. 154(b) by 1427 days.

(21) Appl. No.: 11/288,680

(22) Filed: Nov. 29, 2005

(65) Prior Publication Data

US 2006/0259768 A1 Nov. 16, 2006

Related U.S. Application Data

(60) Provisional application No. 60/681,342, filed on May 16, 2005.

(51) Int. Cl.
G06F 7/04 (2006.01)
G06F 17/30 (2006.01)

(52) U.S. Cl. .............................. 726/2; 713/182
(58) Field of Classification Search ................ 726/2
See application file for complete search history.

(56) References Cited

U.S. PATENT DOCUMENTS 7,227,838 B1 * 6/2007 O'Riordan ................... 370/219
7,546,458 B1 * 6/2009 Singla et al. ................. 713/166
2002/0124107 A1 * 9/2002 Goodwin ....................... 709/242
2004/0208151 A1 * 10/2004 Haverinen et al. ............ 370/338
2006/0068799 A1 * 3/2006 Morton et al. ................. 455/450
2007/0044141 A1 * 2/2007 Lor et al. .......................... 726/3

FOREIGN PATENT DOCUMENTS

EP 1 345 386 A2 2/2003
EP 1345 386 A 9/2003

OTHER PUBLICATIONS

Hewlett-Packard Development Company: "HP ProCurve Networking Security Solutions 802.1X and Guest VLANs", Mar. 2003, pp. 1-8 XP002376320—retrieved from the internet URL: http://www.hp.com/rnd/pdfs/guest_vlan_paper.pdf.
IEEE Standard for Local and Metropolitan Area Networks—Port-Based Network Access Control IEEE STD 802.1X-2001, Jun. 14, 2001 pp. I-VIII, 1, XP002270244.
Hewlett-Packard Development CO: HP ProCurve and Networking Security Solutions; Mar. 2003, pp. 1-8, XP002376320; http://www.hp.com/rnd/pdfs/guest_vlan_paper.pdf.
IEEE Standard for Local and metropolitan area networks-Port-based Network access Control'; Jun. 14, 2001, pp. I-VIII, 1, XP002270244.

* cited by examiner

*Primary Examiner* — Christopher J Brown
(74) *Attorney, Agent, or Firm* — Galasso & Assoc. L.P.

(57) ABSTRACT

Apparatus, and an associated method, for selectably providing access to a communication device connected to a network access port in a communication network. When a communication device is connected at the access port, its connection is detected by a detector. A determiner determines whether the communication device is 802.1x capable. If the device is non-802.1x capable, the device is assigned to a selected, non-secure VLAN by way of which to communicate.

20 Claims, 3 Drawing Sheets

APPARATUS, AND ASSOCIATED METHOD, FOR PROVIDING COMMUNICATION ACCESS TO A COMMUNICATION DEVICE AT A NETWORK ACCESS PORT

This application claims priority of U.S. Provisional Patent Application No. 60/681,342 entitled "Providing Dedicated VLAN Access for Non 802.1x Capable Devices to Co-Exist with 802.1x Clients on an 802.1x Enabled Authentication Network Access Port", filed on May 16, 2005, the contents of which are hereby incorporated by reference.

The present invention relates generally to authentication of a communication device, such as an IP (Internet Protocol) phone, connectable to a communication network. More particularly, the present invention relates to apparatus, and an associated method, by which to provide dedicated VLAN (Virtual Local Area Network) access to a non-802.1x capable device when connected to a 802.1x enabled authentication port of the communication network. A single network access point, an 802.1x enabled authentication port, is used by both 802.1x capable devices and non-802.1x capable devices. The need to provide separate access ports for the separate types of devices is obviated.

BACKGROUND OF THE INVENTION

Telephonic communications are pervasive throughout modern society. Access to, and the ready availability to communicate by way of, a communication network that provides for telephonic communications is a practical necessity for many. Both voice, and non-voice, data is communicated by way of different types of communication networks that provide telephonic communications.

Networks of communication systems that provide for telephonic communications have been deployed throughout significant portions of the populated portions of the world. Users communicate telephonically through the use of telephonic, or other, communication stations that are connected to the networks. And, through appropriate interconnection of the separate networks, telephonic communications are carried out between sets of telephonic stations positioned at disparate locations by way of the interconnected, communications networks.

Circuit-switched communication techniques have historically been used by conventional telephonic networks. When circuit-switched communication techniques are used, circuit-switched connections are formed between the telephonic stations that are parties to a telephonic communication session. Dedicated, i.e., circuit-switched, channels are allocated to the telephonic stations by which to communicate the data therebetween. The dedicated connection is maintained irrespective of the amount, or regularity, of the communication of the data between the communication stations. As a result, the communication capacities of circuit-switched telephonic communication networks are relatively low as the maintenance of dedicated connections sometimes inefficiently utilizes the communication capacity of the telephonic communication network.

More recently, communication networks that make use of packet-switched communication techniques that provide for shared-channel communications have been deployed. Typically, packet-formatted data is communicated between communication stations that are connected to, or otherwise form part of, the communication network that provides for the packet-switched communications. Various packet formatting schemes have been developed and standardized. One protocol scheme, referred to as the Internet Protocol (IP), has achieved widespread acceptance and many communication devices have apparatus constructed to format and send, to receive, to transport, and to operate upon IP-formatted data.

Additionally, a series of operating specifications of the IEEE 802 family of communication standards defines operating protocols and procedures by which communication devices that comport with the requirements of the relevant IEEE standard 802 shall be operable to assure their operability in a communication network that operates pursuant to such standards. Amongst the protocol set forth in the operating specifications are authentication procedures and protocols. Authentication protocols are carried out to authenticate a communication device to access a communication network or to communicate with another communication device.

Many conventional personal computers regularly are constructed to be 802.1x compliant, capable, amongst other things, to be authenticated or perform authentications pursuant to the IEEE802.1x authentication procedures when connected to an IEEE802.1x enabled authentication port.

IP (Internet Protocol) phones, connectable to such communication networks, however, generally are not compliant with the IEEE802.1x protocols, particularly those relating to authentication procedures. A typical IP phone, therefore, cannot be authenticated using IEEE802.1x authentications. An IP phone and a personal computer that are co-located are conventionally required to be separately connected to separate access ports to a communication network. That is to say, conventionally, the IP phone, to be connected to the communication network, must be connected to a network access port different than an 802.1x enabled authentication port to which a personal computer is connectable.

If a manner could be provided by which to permit the IP phone and the personal computer to be connected to the same network access port, i.e., an 802.1x enabled authentication port, the conventional need to provide connections to the separate access ports would be obviated.

It is in light of this background information related to communication devices connectable to a communication network that the significant improvements of the present invention have evolved.

SUMMARY OF THE INVENTION

The present invention, accordingly, advantageously provides apparatus, and an associated method, for a communication device, such as an IP phone, connectable to a communication network.

Through operation of an embodiment of the present invention, a manner provides dedicated VLAN (Virtual Local Area Network) access to a non-802.1x capable device, such as an IP phone, when connected to an 802.1x enabled authentication port of the communication network.

The IP phone, or other non-802.1x enabled communication device and a personal computer, or other 802.1x capable device, shares the same network access port.

In one aspect of the present invention, both communication devices that are capable of performing 802.1x authentication and those that are unable to perform 802.1x authentication procedures are connectable to the same physical port at the same time and are able to gain network access therethrough. The non-802.1x capable communication device is determined by the network to be non-802.1x capable and, in response to the determination, the data communicated by the communication device is classified to a particular virtual network.

In another aspect of the present invention, the network monitors for the connection of a communication device, such as an IP phone, to a network access port. A connection of a communication device is detected by detecting its identity. A communication device is uniquely identified, for instance, by a medium access control, MAC address. The determination of the MAC address of the communication device is determinative of connection of the communication device to the communication network.

In another aspect of the present invention, upon detection of the connection of the communication device to the communication network, determination is then made as to whether the communication device forms an 802.1x capable device. Determination is made by sending the device, identified by its unique identity, a polling request to the communication device. The polling request forms, for instance, an EAPOL (Extensible Authentication Protocol) request/identity frame. If the communication device is an 802.1x capable device, then the communication device responds to the polling request. Conversely, in the event that the communication device is a non-802.1x capable device, then the device does not respond to the polling request.

When the communication device is determined to be an 802.1x capable device, conventional 802.1x authentication procedures are performed to authenticate the communication device. Conversely, in the event that the communication device is determined to be non-802.1x capable, such as by failure of the device to send an EAPOL-Response/Identity frame responsive to the request sent to the communication device by the communication network, authentication procedures are not attempted or performed.

When the communication device, detected to be connected to the communication network, is determined to be a non-802.1x capable device, traffic, i.e., data communicated by the communication device, is, instead, classified with a selected VLAN and permitted communication with devices of the selected VLAN.

The selected VLAN is selectable in any of various manners, such as by user configuration of the VLAN, selected by group mobility rules, or selected to be a non-secured VLAN. If the communication device forms a non-802.1x capable device, then the selected VLAN is limited to VLANs that are non-secure.

Thereby, separate network access ports are not required to support separately 802.1x capable and non-802.1x capable devices.

In these and other aspects, therefore, apparatus, and an associated method, is provided for enabling a client device access to a selected virtual local area network. Connection of the client device to an authentication enabled port is detected. Then, determination is made whether the client device is enabled to be authenticated pursuant to a selected authentication protocol. And, thereafter, the client device is assigned to the selected virtual local area network when determination is made that the client device is non-enabled to be authenticated pursuant to the selected authentication protocol.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
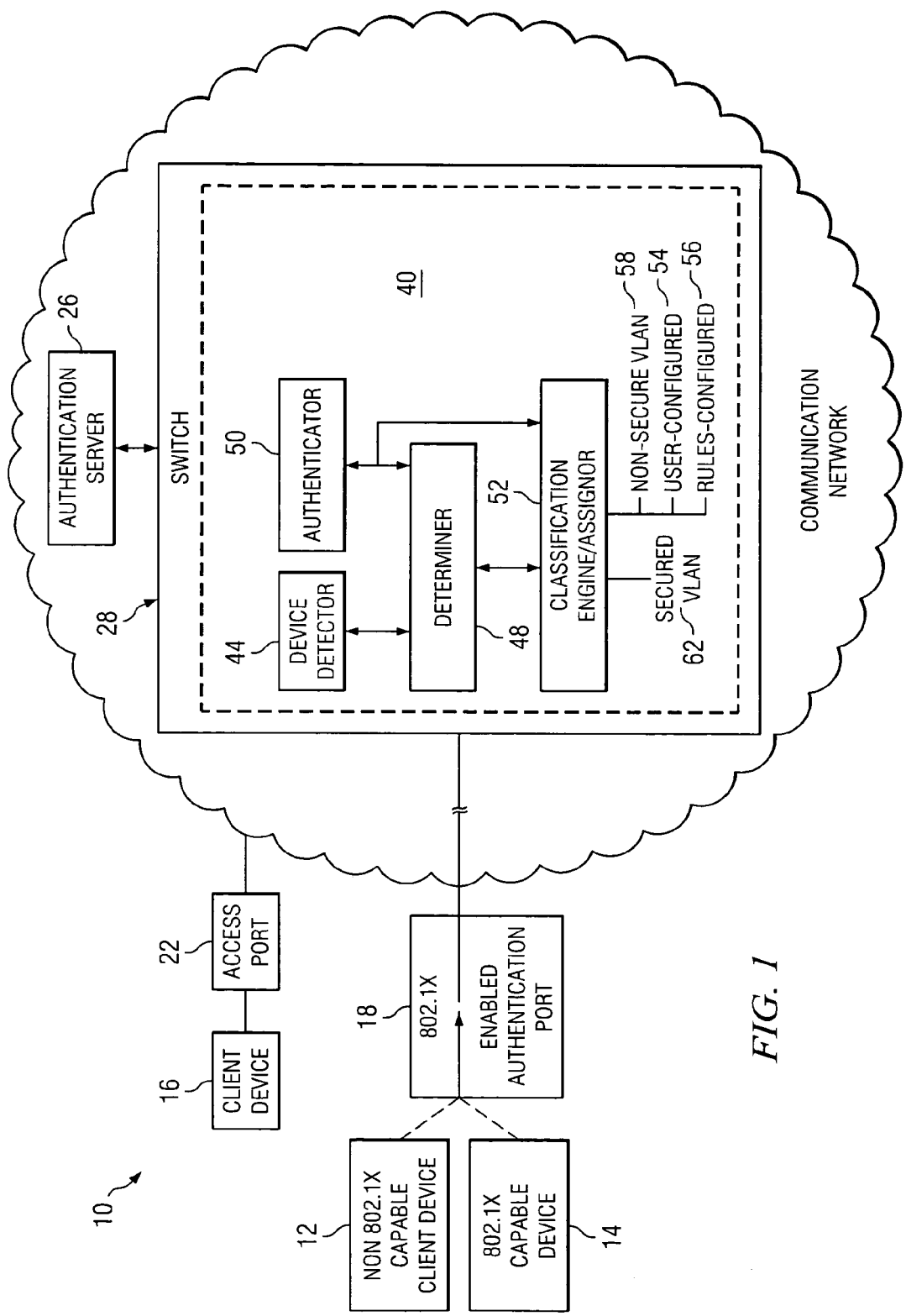
FIG. 1 illustrates a functional block diagram of a telephonic network in which an embodiment of the present invention is operable.

Referring first to FIG. 1, a telephonic network, shown generally at 10, provides for telephonic communications between communication devices, of which three communication devices, devices 12, 14, and 16 are shown in the figure. During operation of the communication network, data is communicated between communication devices, e.g., between the communication device 12 and the communication device 16 or between the communication device 14 and the communication device 16. The devices are connectable to the communication network and form a part thereof, when plugged, or otherwise connected, into an access port, such as one of the access ports 18 and 22.

The access ports 18 and 22 are each 802.1x enabled authentication ports and are configured to permit connection of both 802.1x capable and non-802.1x capable communication devices thereto. Here, the communication device 12 is representative of a non-802.1x capable device, and the device 14 is representative of an 802.1x capable device. That is to say, the device 14 forms a supplicant as the device is 802.1x capable. And, more particularly, in the exemplary implementation, the non-802.1x capable device comprises an IP (Internet Protocol) phone, and the device 14 forms a personal computer, such as a personal computer that operates pursuant to a Microsoft™ Windows XP™ or Windows 2000™ operating system or other operating system that is 802.1x capable. Additionally, a personal computer, that operates pursuant to another operating system that is otherwise non-802.1x capable, can have 802.1x client software installed to make the personal computer 802.1x capable. The device 14 is also representative of this type of computer configuration.

The communication network includes various functional entities, including an 802.1x authentication server 26. The communication network also includes a switch entity 28.

The authentication server 26 operates to perform, or otherwise carry out, authentications of communication devices that are to be parties to communication sessions in which data is communicated by, or to, the communication devices. The authentications are carried out in conformity with conventional IEEE802.1x procedures.

The switch entity 28 performs various switching operations and, in the exemplary implementation, is implemented as an Alcatel™ OS7000™ switch. Switching functions performed by the switch entity controls various operations in the communication network and provide for packet-switched connectivity between communication devices to communicate data therebetween.

Various, virtual local area networks (VLANs) are definable in the communication network. VLANs that are definable include both secure VLANs and non-secure VLANs, including, e.g., user-defined VLANs and group-mobility-rules-configured VLANs. The VLANs are configurable and reconfigurable, all in conventional manner.

As mentioned previously, 802.1x capable devices and non-802.1x capable devices must conventionally be separately ported at separate network access ports, requiring a physical location to maintain the separate access ports if such separate devices are to be co-located. An embodiment of the present invention provides a manner by which to permit VLAN access to a non-802.1x capable device when connected to an 802.1x enabled authentication port. Both the non-802.1x capable device and the 802.1x capable device are able to co-exist and to be connected concurrently to a single 802.1x enabled authentication port. That is to say, with respect to the illustration shown in FIG. 1, both the devices 12 and 14 are together connectable to the port 18.

Pursuant to an embodiment of the present invention, the switch entity 28 includes apparatus 40. The apparatus 40 is here shown to be formed of functional entities, implementable in any desired manner, including algorithms executable by processing circuitry.

In the exemplary implementation, the apparatus 40 includes a device detector 44, a determiner 48, an authenticator 50, and an assignor/classification engine 52.

The detector 44 operates to detect connection of a communication device at a network access port, such as the network access port 18. The detector operates to detect the connection of a device at the network access port by the MAC (Medium Access Control) address that uniquely identifies the device and which is ascertainable by the detector upon connection of the device at the access port.

Once detection is made of the device at the network access port, a determination is made by the determiner of the type of device that the communication device forms. That is to say, the determiner operates to determine whether the device is a non-802.1x capable device or is an 802.1x capable device. In the exemplary implementation, the determiner makes the determination by sending an EAP (Extensible Authentication Protocol) request/identity frame to the detected communication device, such as by addressing the frame to the MAC address of the device.

Once generated, the request/identity frame is delivered to the network access port and the communication device connected thereto. An 802.1x capable device is capable of detecting the frame and, in response, generating an EAP Response/Identity frame. In contrast, a non-802.1x device is not able to answer the polling request, i.e., the request/identity frame. The determiner thereby determines the communication device-type by determining whether an EAP/Response Identity frame is returned by the communication device in response to the polling request. In one implementation, an additional one or more polling requests are generated in the absence of detection of a start response to the polling request, thereby to ensure better that the device, if 802.1x capable, responds, even if one of the requests is missed.

When an EAPOL-Start frame, or other polling response, is detected, the determiner informs the authenticator 50. The authenticator collects information about the supplicant formed of the device 14 and provides the information to the authentication server 26. Authentication procedures are performed to authenticate the 802.1x capable device and, once authenticated, the device is provided access to communicate by way of the communication network in conventional manner that any authenticated device would be permitted once authenticated. The authentication server 26 also, in one implementation, makes selection of the VLAN that the 802.1x device is granted access in which to communicate.

If, conversely, the determiner determines the communication device to be non-802.1x capable, authentication procedures of the authenticator are not invoked as the authentication would fail. Instead, the indication of the determiner is provided to the assignor/classification engine 52, and the assignor/classification engine 52 operates to assign access to the non-802.1x capable device to a selected VLAN. The selected VLAN comprises, for instance, the user-configured VLAN 54, or a group-mobility-rules configured VLAN 56, configured by the group mobility rules of the network, or other non-secured VLAN 58. The non-secured VLAN is distinguishable from a secured VLAN 62 in that a communication device is not granted access to the secured VLAN unless the device has been successfully authenticated.

In the exemplary implementation in which the non-802.1x device forms an IP phone, the IP phone is granted access only to a non-secured VLAN as an IP phone is, conventionally, not capable of being 802.1x authenticated. And, in the exemplary implementation in which the device 14 forms the 802.1x capable personal computer, the personal computer is granted access to the secure VLAN.

Figure 2:
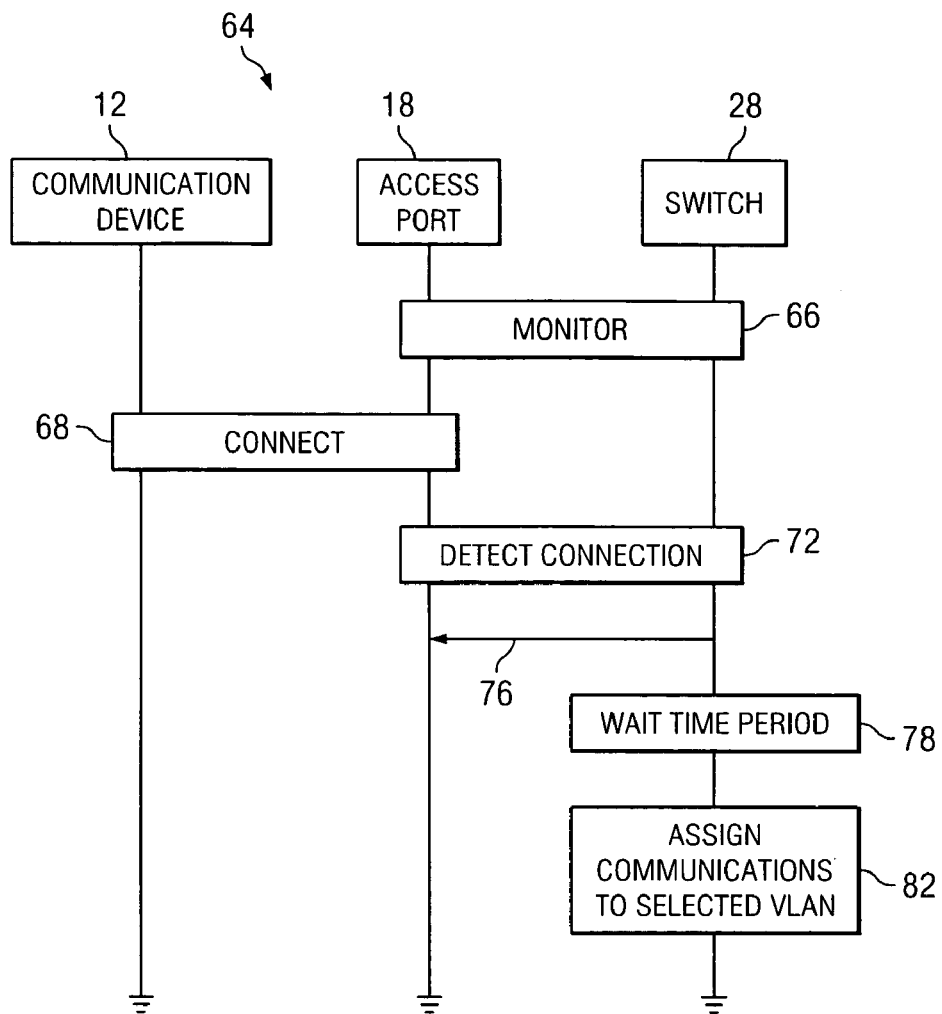
FIG. 2 illustrates a sequence flow diagram representative of messages generated during operation of the telephonic network shown in FIG. 1 pursuant to operation of an embodiment of the present invention.

FIG. 2 illustrates a sequence flow diagram, shown generally at 64, representative of operation of the telephonic network shown in FIG. 10 when the non-802.1x capable device is connected at the network access port 18.

Monitoring is performed, indicated by the block 66, to detect connection of the communication device 12 to the network access port. As indicated at the block 68, the communication device 12 is connected, such as by a plug connection, to the access port. Detection is made, indicated by the block 72 of the connection of the communication device at the access port.

Thereafter, and as indicated by the segment 76, an EAPOL Request/Identity frame is sent to the access port at which the communication device is connected. Because the communication device is non-802.1x capable, a reply is not generated in response to the polling request. Upon expiration of an appropriate time period, indicated by the block 78, the switch entity assigns, indicated by the block 82, communications of the communication device to a selected VLAN. The selected VLAN forms a non-secure VLAN.

Figure 3:
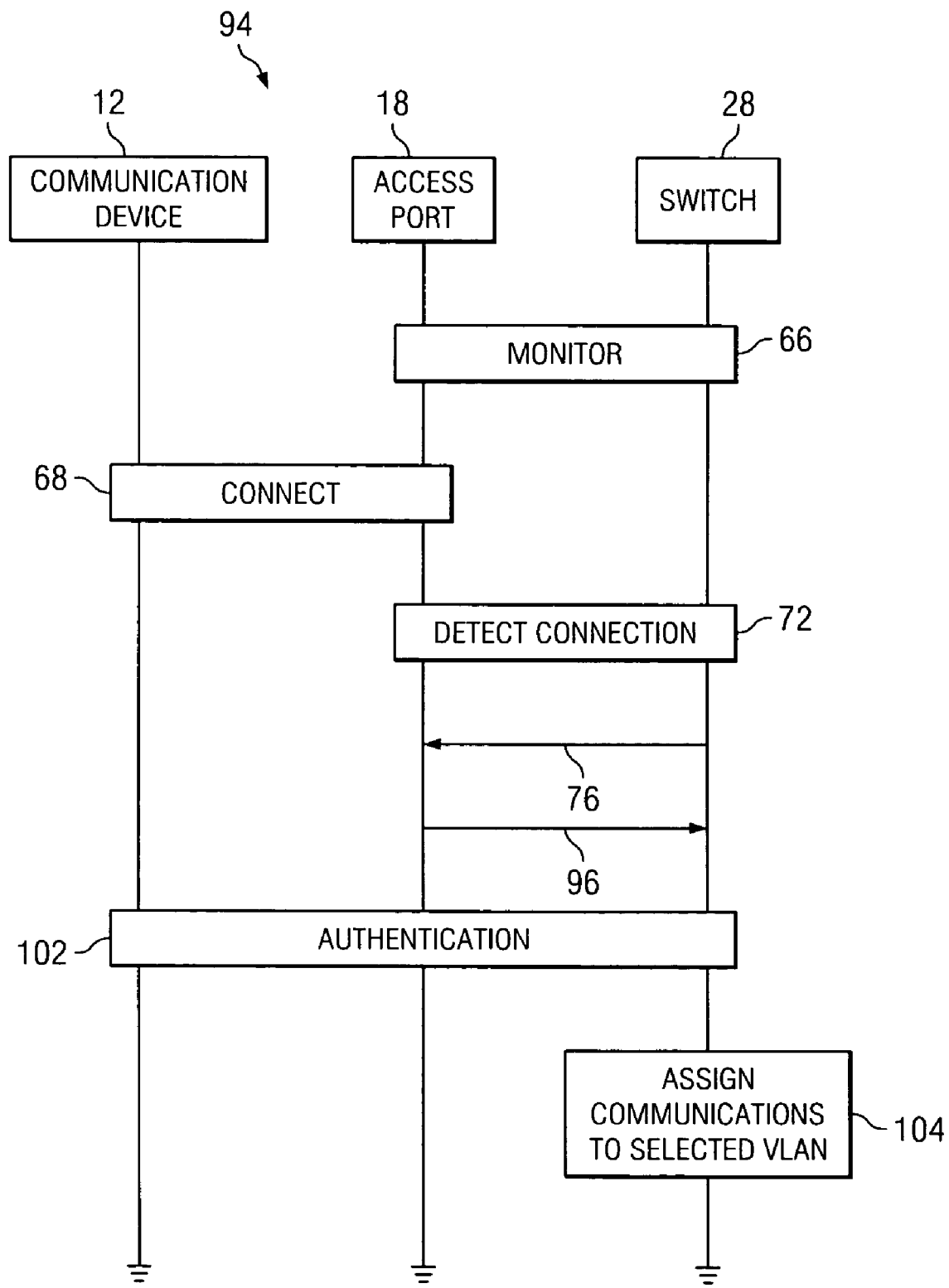
FIG. 3 illustrates a sequence flow diagram, similar to that shown in FIG. 2, but representative of other operation of an embodiment of the present invention.

FIG. 3 illustrates a message sequence diagram, similar to that shown in FIG. 2, but here representative of operation of the network when the communication device 14 is connected at the access port 18. Again, the operations of monitoring, connecting, and detecting 66, 68, and 72, respectively, are performed. And, upon detection of the MAC address of the communication device 14, an EAP-request/identity frame is sent to the access port at which the communication device is connected.

Because the communication device 14 is 802.1x capable, the device generates an EAPOL-Response/Identity frame in response to the polling request as indicated by the segment 96. Thereafter, authentication procedures are carried out, indicated by the block 102, and once authenticated, the communication device is assigned access, indicated by the block 104, to a VLAN. The VLAN to which the communication device is granted access includes a secure VLAN as the communication device is authenticated.

Figure 4:
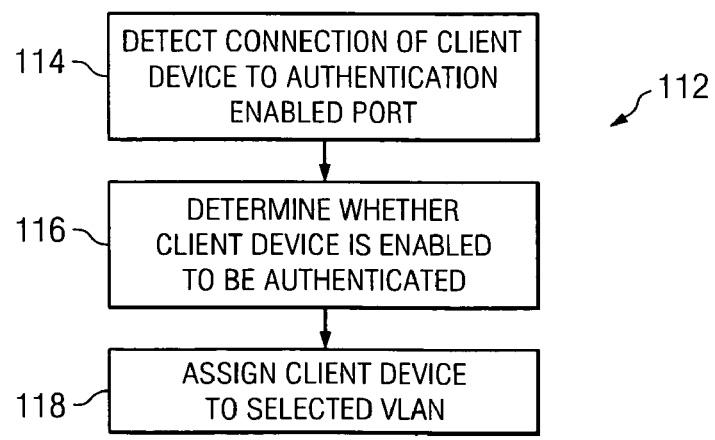
FIG. 4 illustrates a method flow diagram representative of the method of operation of an embodiment of the present invention.

FIG. 4 illustrates a method flow diagram, shown in generally at 112, representative of the method of operation of an embodiment of the present invention. The method enables a client device access to a selected virtual local area network.

First, and as indicated by the block 114, connection of the client device to an authentication enabled port is detected.

Then, and as indicated by the block 116, a determination is made whether the client device is enabled to be authenticated pursuant to a selected authentication protocol. And, as indicated by the block 118, the client device is assigned to the selected virtual local area network when determination is made that the client device is non-enabled to be authenticated pursuant to the selected authentication protocol.

Thereby, through operation of an embodiment of the present invention, a manner is provided by which to permit a non-802.1x capable device to be connected to an 802.1x enabled port and to be granted access to communicate by way of a selected non-secure VLAN. The need, conventionally, otherwise to provide separate access ports for non-802.1x capable devices and 802.1x capable devices is obviated.

The previous descriptions are of preferred examples for implementing the invention, and the scope of the invention should not necessarily be limited by this description. The scope of the present invention is defined by the following claims.

What is claimed is:

1. A method for enabling a client device access to a selected virtual local area network, said method comprising the operations of:
   detecting connection of the client device to an authentication enabled port;
   determining whether the client device is enabled to be authenticated pursuant to an authentication protocol used by the authentication enabled port;
   precluding the authentication protocol of the authentication enabled port from being invoked for the client device when determination is made that the client device is not enabled for being authenticated pursuant to the authentication protocol used by the authentication enabled port for authenticating client devices connected thereto; and
   assigning the client device to a selected non-secured virtual local area network while the client device remains connected to the authentication enabled port after said determination is made that the client device is not enabled for being authenticated pursuant to the authentication protocol used by the authentication enabled port for authenticating client devices connected thereto thereby allowing the client device to be connected to and communicate through the authentication enabled port concurrently with a client device that is enabled for being authenticated pursuant to the authentication protocol used by the authentication enabled port for authenticating client devices connected thereto.

2. The method of claim 1 wherein said operation of detecting comprises detecting an identifier that identifies the client device.

3. The method of claim 1 wherein said operation of detecting comprises detecting a Medium Access Control layer address of the client device.

4. The method of claim 1 wherein said operation of determining comprises sending a polling request to the client device.

5. The method of claim 4 wherein the polling request sent during said operation of determining comprises an EAP (Extensible Authentication Protocol) Request/Identity frame sent to the client device.

6. The method of claim 4 wherein said operation of determining further comprises detecting whether the client device responds to the polling request.

7. The method of claim 6 wherein the client device is determined during said operation of determining to be enabled to be authenticated if the client device responds to the polling request.

8. The method of claim 6 wherein the client device is determined during said operation of determining to be non-enabled to be authenticated if said operation of detecting fails to detect response to the by the client device to the polling request.

9. The method of claim 1 wherein the selected virtual local area network to which the client device is assigned during said operation of assigning comprises a user-configured virtual local area network.

10. The method of claim 9 further comprising the operation of configuring, by a user of the client device, the user-configured virtual local area network.

11. The method of claim 1 wherein the selected virtual local area network to which the client device is assigned during said operation of assigning comprises a group mobility rules configured virtual local area network.

12. Apparatus for enabling a client device access to a selected virtual local area network, said apparatus comprising:
   a device detector configured to detect connection of the client device to an authentication enabled port;
   a determiner operable responsive to detection by said device detector of the connection of the client device, said determiner configured to determine whether the client device is enabled to be authenticated pursuant to an authentication protocol used by the authentication enabled port;
   an authenticator configured for precluding the authentication protocol of the authentication enabled port from being invoked for the client device when determination is made that the client device is not enabled for being authenticated pursuant to the authentication protocol used by the authentication enabled port for authenticating client devices connected thereto; and
   an assignor configured to assign the client device to a selected non-secured virtual local area network while the client device remains connected to the authentication enabled port after said determination is made that the client device is not enabled for being authenticated pursuant to the authentication protocol used by the authentication enabled port for authenticating client devices connected thereto thereby allowing the client device to be connected to and to communicate through the authentication enabled port concurrently with a client device that is enabled for being authenticated pursuant to the authentication protocol used by the authentication enabled port for authenticating client devices connected thereto.

13. The apparatus of claim 12 wherein said device detector detects connection of the client device to the authentication enabled port by detecting a Medium Access Control layer identifier of the client device.

14. The apparatus of claim 12 wherein said determiner comprises a polling request generator configured to generate and send a polling request to the client device.

15. The apparatus of claim 14 wherein the polling request generated by said polling request generator comprises an EAP (Extensible Authentication Protocol) Request/Identity frame.

16. The apparatus of claim 14 wherein said determiner further comprises a response detector configured to detect a client-generated response to polling requests.

17. The apparatus of claim 16 wherein said determiner determines the client device to be non-enabled to be authenticated pursuant to the selected authentication protocol in absence of detection by said response detector of the client-generated response to the polling request.

18. The apparatus of claim 12 wherein said assignor is configured to assign the client device to a user configured virtual local area network.

19. The apparatus of claim 12 wherein the client device comprises an IP (Internet Protocol) phone, and wherein the authentication enabled port that said detector detects connection of the client device thereto comprises an 802.1x authentication enabled port.

20. Telephonic network switch apparatus for selectably enabling access of a client device to a selected virtual local area network, said apparatus comprising:
- a detector configured to detect connection of the client device at an 802.1x authentication enabled port, wherein the authentication enabled port includes a physical port;
- an enablement determiner operable responsive to detection by said detector of the connection of the client device, said enablement determiner configured to determine whether the client device is enabled to be authenticated pursuant to 802.1x authentication protocol used by the 802.1x authentication enabled port;
- an authenticator configured for precluding the 802.1x authentication protocol of the authentication enabled port from being invoked for the client device when determination is made that the client device is not enabled for being authenticated pursuant to the 802.1x authentication protocol used by the authentication enabled port for authenticating client devices connected thereto; and
- a communications assignor configured selectably to assign communication connectivity of the client device to a selected non-secured virtual local area network while the client device remains connected to the 802.1x authentication enabled port responsive to said determination being made by said enablement determiner that the client device is not enabled for being authenticated pursuant to the 802.1x authentication protocol used by the 802.1x authentication enabled port for authenticating client devices connected thereto thereby allowing the client device to be connected to and to communicate through the 802.1x authentication enabled port concurrently with a client device that is enabled for being authenticated pursuant to the authentication protocol used by the 802.1x authentication enabled port for authenticating client devices connected thereto.

* * * * *